Figure 1:
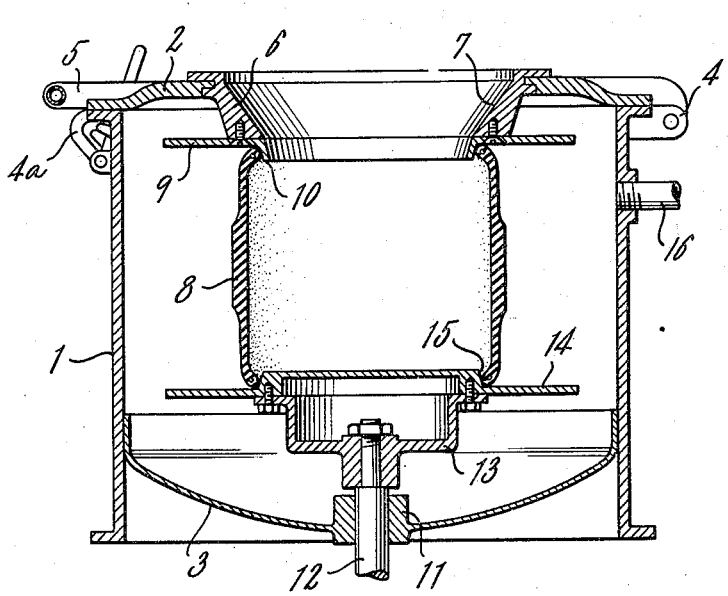

July 24, 1951      E. S. THOMPSON      2,561,958

VACUUM SHAPING BOX FOR TIRES

Filed May 12, 1948

INVENTOR.
ELMER S. THOMPSON
BY Henry P. Truesdell
ATTORNEY

Patented July 24, 1951

2,561,958

UNITED STATES PATENT OFFICE 2,561,958

VACUUM SHAPING BOX FOR TIRES

Elmer S. Thompson, Detroit, Mich., assignor to United States Rubber Company, New York, N. Y., a corporation of New Jersey Application May 12, 1948, Serial No. 26,541

3 Claims. (Cl. 18—2)

This invention relates to tire machinery and, in particular, it relates to an apparatus for shaping pneumatic tire casings.

In the manufacture of pneumatic tires, it is customary to build a tire in band form and subsequently expand or shape the band so that it will assume the form of a tire casing. A so-called "vacuum box" is most commonly used for this purpose. In the operation of such a vacuum box, the beads of the tire are brought together while vacuum is simultaneously applied to the outer surface of the band. As a result of this differential pressure, the tire casing is converted from band form to tire shape.

Heretofore, it has been factory practice to shape tires in a vacuum box in which the tire beads are sealed against conical shaped supporting members. Such an apparatus is disclosed in the patent to Evans, No. 2,329,258 of September 14, 1943.

In making the smaller size tires, the smaller rim diameter makes it rather difficult to insert a curing bag within the shaped tire. It is customary when inserting curing bags into the tire to accomplish this operation manually. However, certain mechanical devices such as pneumatically operated push arms are frequently used to relieve the operator of the more strenuous task of forcing the bag into the shaped casing.

Under the conditions mentioned, the curing bags do not readily adjust themselves in the tire casing. That is, the bags frequently become buckled or creased particularly in the crown region of the bag. This is not always apparent to the operator with the result that a defective tire is produced.

I have found that if a supporting plate is positioned in the shaping box so as to provide a rigid support for the side walls of the tire that a curing bag can be better disposed within the casing. By such an arrangement, there is no danger of the curing bag distorting the tire into a position other than radial. The use of such plates allows all of the pressure exerted by the curing bag to be directed in a radial path. This tends to confine the expansion of the casing to the most desired path and allows a better expansion of the curing bag within the casing. It is generally customary to inflate the curing bag with air directly after the curing bag is inserted in the casing. This internal pressure within the casing in combination with the vacuum applied exteriorly of the casing and in combination with the confining side wall plates, results in proper directional expansion of the casing so as to permit the curing bag to rest therewith free of buckles or creases.

It is, therefore, among the objects of my invention to provide a vacuum shaping box which permits a better assembled relationship of a curing bag with a shaped tire casing; to provide a shaping box in which the curing bag may be assembled properly within the tire casing in a shorter period; and to provide such a shaping box which operates efficiently and which may be manufactured economically. These and other objects and advantages will appear more fully in the following detailed description when considered in connection with the accompanying drawing, in which Fig. 1 is a side elevational view in section of a vacuum shaping box incorporating the features of my invention, and Fig. 2 is a view similar to Fig. 1 with a tire casing shaped therein.

Figure 2:
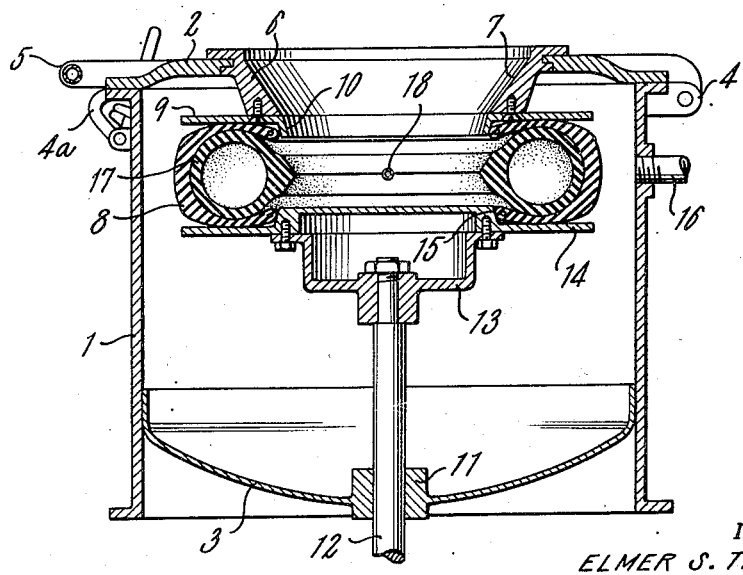

Referring to Fig. 1 of the drawing, I show an embodiment of my invention in the form of a cylindrical chamber 1 having a lid 2 enclosing its upper end and a wall 3 enclosing its lower end. The lid 2 includes a hinge 4 for attaching the lid to the chamber 1 and it may be fastened in seated position by any conventional clamping means 4. Also, a handle 5 provides means for manually opening the lid 2. A collar or sealing member 6 is provided with an opening 7 extending through the lid 2. The purpose of this opening 7 is to provide a funnel-like or tapered entrance for guiding a curing bag to the interior of a tire casing 8. Attached to the collar 6 is a plate 9 or disc of washer-like shape having an inwardly turned flange portion 10 for the purpose of forming a seat and a seal for one of the beads of the tire casing 8. The flange portion extends axially of the plate and forms an aperture in alignment with the opening 7 in the collar. The inner surface of the flange is tapered at approximately the same angle as the opening 7 while the outer surface is tapered to provide a seat for the casing beads. The arrangement is such that the plate extends radially from the aperture to form a support for the side walls of the tire casing in a manner to be described later.

Positioned centrally of the lower end enclosure 3 is a boss 11 through which a shaft 12 is axially slidable. Attached to the shaft 12 is a flange bracket 13 which, in turn, supports a disc-like plate 14. The plate 14 includes a tapered shoulder portion 15 which constitutes a seal and seat for the other bead of the tire. The shaft 12 is connected to a hydraulic cylinder (not shown) or some other mechanical means for moving the shaft axially so as to bring the opposite bead portions of the tire casing 8 toward each other. A vacuum connection 16 communicates with a source of vacuum for acting upon the tire casing.

The plates 9 and 14 are parallel to each other and include the aforementioned tapered sealing portions 10 and 15, respectively, upon which the beads of a tire are positioned in contact. The outer diameters of these plates 9 and 14 are substantially equal to or greater than the diameters of the tires with which the shaping box is used. The invention may be used in shaping both large and small diameter tires.

In the operation of the shaping box, the lid 2 is held in open position and the plate 14 is in its lowermost position, as shown in Fig. 1. The tire 8, in band form, is positioned so that its bead portion is engaged with the shoulder 15 of the plate 14. Thereafter the lid is closed causing the opposite bead of the tire band 8 to become sealed with the flange portion 10 of the plate 9. At this time, the shaft 12 is moved axially so as to advance the plate 14 toward the plate 9. Simultaneously, vacuum is applied through the conduit 16. The result of this action causes the tire band 8 to be shaped to tire form, as shown in Fig. 2. When the tire has been so shaped, a curing bag 17 is manually or mechanically forced through the funnel shaped aperture 7 and the aperture in the plate 9 into the cavity formed by the shaped tire 8. Considerable pressures are exerted in assembling the curing bag within the tire casing. The plates 9 and 14 support the tire casing in such a manner that insertion of the curing bag will not displace the tire beads nor distort the tire at local portions in a direction axially of the tire. In other words, the presence of the plates 9 and 14 limits all distortion or expansion of the casing to a direction radial from the center line of the tire. After the curing bag has been inserted in the tire casing, air may be introduced into a connector 18 of the curing bag for the purpose of exerting additional pressure. This provides a better annular positioning of the curing bag within the tire casing. To further assist in proper positioning of the curing bag, the shaft 12 carrying the plate 14 may be moved a short distance axially away from the plate 9 and then brought against the casing with substantial pressure. This action flexes the shaped casing and helps in the removal of any localized strains between the curing bag and the casing so as to assure a better assembled relationship between the curing bag and the tire casing.

As thus shown and described, it is believed apparent that I have provided a novel apparatus for shaping tires and for permitting assembly of curing bags therewith. According to actual tests, such mechanism has resulted in a substantial decrease in defective tires, and a substantial decrease in the time required to complete the shaping and bagging operation. This results in a substantial savings in the cost of manufacturing tires.

Having thus described my invention, what I claim and desire to protect by Letters Patent is:

1. An apparatus for manufacturing pneumatic tires comprising a cylindrical wall forming a chamber, a lower end enclosing wall and a hinged cover cooperating with the upper end of the cylindrical wall and having an aperture extending therethrough, a flat plate attached to the cover and having a central aperture in alignment with said cover aperture, a flange on the plate extending axially thereof and adjacent the plate aperture for engaging one of the bead portions of a tire casing, a second flat plate parallel to and movable axially relative to said first named plate, a shoulder portion extending from said second plate and in axial alignment with the flange of said first named plate for engaging the opposite bead portion of said tire, means for advancing the second named plate toward the first named plate so that the tire casing is deformed into engagement with said plates, and means for evacuating the chamber.

2. An apparatus for shaping a tire casing band comprising a chamber provided with means for applying a vacuum therein, a cover for said chamber having an opening therein, a flat plate secured to said cover and having a flange forming an aperture in alignment with said cover aperture and a seat for engaging and supporting one of the beads of the tire band, a second flat plate within said chamber movable toward and away from said first mentioned plate for supporting the other bead of the tire band, and means for moving the second plate toward the first mentioned plate to deform the casing from band to tire shape, the plates serving to support the side walls of the tire casing during shaping.

3. In an apparatus for shaping a tire casing band, a chamber for receiving the casing and being provided with means for applying a vacuum thereto, a cover for said chamber having an opening for insertion of a curing bag and being provided with means for engaging and supporting one of the beads of the tire casing, a flat plate secured to said cover and extending radially from said aperture for supporting one side wall of the tire band during shaping, a member within said chamber movable toward and away from said cover for supporting the other bead of the tire band, said member being provided with a flat plate for supporting the other side wall of the tire casing during shaping, and means for moving said member toward the cover to deform the casing from band to tire shape.

ELMER S. THOMPSON.

REFERENCES CITED

The following references are of record in the file of this patent:

UNITED STATES PATENTS

| Number | Name | Date |
|---|---|---|
| 1,480,719 | Gammeter | Jan. 15, 1924 |
| 1,487,034 | Sloper | Mar. 18, 1924 |
| 2,329,258 | Evans | Sept. 14, 1943 |